(12) United States Patent
Kuramoto et al.

(10) Patent No.: US 12,411,104 B2
(45) Date of Patent: Sep. 9, 2025

(54) MEMBRANE-TYPE SENSOR AND ANALYZING APPARATUS INCLUDING THE SAME

(71) Applicant: HORIBA Advanced Techno, Co., Ltd., Kyoto (JP)

(72) Inventors: Hisanori Kuramoto, Kyoto (JP); Kumi Naito, Kyoto (JP)

(73) Assignee: HORIBA ADVANCED TECHNO, CO., LTD., Kyoto (JP)

( * ) Notice: Subject to any disclaimer, the term of this patent is extended or adjusted under 35 U.S.C. 154(b) by 159 days.

(21) Appl. No.: 17/533,422

(22) Filed: Nov. 23, 2021

(65) Prior Publication Data

US 2022/0170881 A1 Jun. 2, 2022

(30) Foreign Application Priority Data

Dec. 1, 2020 (JP) .................................. 2020-199341

(51) Int. Cl.
*G01N 27/404* (2006.01)
*G01N 27/40* (2006.01)

(52) U.S. Cl.
CPC ........... *G01N 27/404* (2013.01); *G01N 27/40* (2013.01)

(58) Field of Classification Search
CPC ...... G01N 27/404; G01N 27/40; G01N 27/07; G01N 27/327; G01N 27/416
See application file for complete search history.

(56) References Cited

U.S. PATENT DOCUMENTS

| 5,770,039 A | * | 6/1998 | Rigney | ................ G01N 27/404 |
| | | | | 204/418 |
| 2006/0163088 A1 | * | 7/2006 | Xu | ........................ G01N 27/404 |
| | | | | 205/793 |

(Continued)

FOREIGN PATENT DOCUMENTS

| DE | 1498721 | | 7/1970 |
| DE | 1498721 A1 | * | 7/1970 |

(Continued)

OTHER PUBLICATIONS

Ono et al., English translation of JP2010107335A, 2010 (Year: 2010).*

(Continued)

*Primary Examiner* — Luan V Van
*Assistant Examiner* — Shizhi Qian
(74) *Attorney, Agent, or Firm* — GREENBLUM & BERNSTEIN, P.L.C.

(57) ABSTRACT

A membrane-type sensor that allow a specific substance in a sample solution to permeate through a membrane to be detected based on a current flowing between a working electrode and a counter electrode that are immersed in an internal solution. A housing includes a housing unit containing the internal solution and an electrode structure, and a lid member attached to a tip end portion of the housing unit. The lid member fixing the membrane by sandwiching the membrane between the lid member and the housing unit such that the membrane opposes a tip end surface of the electrode structure. The membrane is sandwiched between the tip end surface of the electrode structure and the opposing surface of the lid member through a seal member, is pressed against the tip end surface of the electrode structure by the seal member, and is fixed in a liquid-tight manner.

6 Claims, 7 Drawing Sheets

(56) References Cited

U.S. PATENT DOCUMENTS

2018/0067107 A1* 3/2018 Barrett ................ C12Q 1/6825
2019/0011399 A1* 1/2019 Wilke ................ G01N 33/1886

FOREIGN PATENT DOCUMENTS

| EP | 0380804 A1 * | 8/1990 |
| JP | 52-95487 | 1/1976 |
| JP | 62-71556 | 5/1987 |
| JP | 6-130025 | 5/1994 |
| JP | 11-2619 | 1/1999 |
| JP | 11-183424 | 7/1999 |
| JP | 2002039984 A * | 2/2002 |
| JP | 2004-205422 | 7/2004 |
| JP | 2005-274311 | 10/2005 |
| JP | 2006-234508 | 9/2006 |
| JP | 2009069025 A * | 4/2009 |
| JP | 2009276209 A * | 11/2009 |
| JP | 2010-107335 | 5/2010 |
| JP | 2010107335 A * | 5/2010 |
| JP | 2019-66330 | 4/2019 |
| TW | I697667 | 7/2020 |
| WO | 2022/091947 | 5/2022 |

OTHER PUBLICATIONS

Eschweiler W., English translation of DE1498721A1, 1970 (Year: 1970).*

Ito et al., English translation of JP2002039984A, 2002 (Year: 2002).*

Ono et al., English translation of JP2009276209A, 2009 (Year: 2009).*

Extended European Search Report, European Patent Office, in European Application No. 21210920.1, issued on Apr. 5, 2022 (in English).

Japan, Notice of Reasons for Refusal issued in JP patent application No. 2020-199341, dated May 14, 2024.

Taiwan, Office Action issued in TW patent application No. 110143745, dated May 6, 2025, and English language translation thereof.

* cited by examiner

MEMBRANE-TYPE SENSOR AND ANALYZING APPARATUS INCLUDING THE SAME

BACKGROUND

Technical Field

The present invention relates to a membrane-type sensor that detects a specific substance contained in a sample solution and an analyzing apparatus that includes the membrane-type sensor.

Related Art

A membrane-type sensor has been known that has a housing that contains an internal solution, a working electrode, and a counter electrode, and a membrane that is fixed in a liquid-tight manner to the housing and allows a specific substance to permeate therethrough and into the housing. This membrane-type sensor is used by immersing a membrane in a sample solution. The membrane-type sensor can measure concentration or the like of the specific substance, such as dissolved oxygen, that has permeated through the membrane by subjecting the specific substance to a reduction reaction on a surface of the working electrode, and measuring a current change generated through the reduction reaction.

As such a membrane-type sensor, for example, an internal solution replenishment type sensor has been recently known in which an internal solution can be supplied from a tank provided outside to an internal solution storage space formed inside the sensor (see, for example, JP 2010-107335 A).

PRIOR ART DOCUMENT

Patent Document

Patent Document 1: JP 2010-107335 A

SUMMARY

The membrane-type sensor, which is of the internal solution replenishment type as described above, can suppress deterioration or the like of the internal solution by allowing the internal solution to be supplied into the membrane-type sensor. However, the internal solution storage space is connected to the tank installed under atmospheric pressure, and thus pressure of the internal solution, which supports the membrane, may be reduced compared to that in an internal solution non-replenishment type sensor. Hence, immersing the membrane in a sample solution during measurement may deform the membrane under the pressure of the sample solution, thus reducing measurement precision.

The present invention has been made in response to the above issue, and it is a main object of the present invention to provide a membrane-type sensor that has an improved pressure resistance of a membrane provided therein while suppressing deterioration of an internal solution.

That is, a membrane-type sensor according to one aspect of the present invention, which has a membrane that allows a specific substance in a sample solution to permeate through the membrane and detects the specific substance that has permeated through the membrane based on a current flowing between a working electrode and a counter electrode that are immersed in an internal solution, and which is of an internal solution replenishment type that is configured to allow the internal solution to be supplied from the outside, includes a housing having a housing unit that contains the internal solution and an electrode structure having a tip end surface on which the working electrode is exposed, and a lid member attached to a tip end portion of the housing unit, the lid member fixing the membrane by sandwiching the membrane between the lid member and the housing unit such that the membrane opposes the tip end surface of the electrode structure. The lid member has an opposing surface that opposes the tip end surface of the electrode structure. The membrane is sandwiched between the tip end surface of the electrode structure and the opposing surface of the lid member through a seal member and is fixed in a liquid-tight manner.

According to such a configuration, the configuration is made such that the internal solution can be supplied from the outside, and thus it is possible to suppress deterioration, which occurs with measurement, such as reduction in a pH value of the internal solution. In addition, the membrane is sandwiched between the tip end surface of the electrode structure and the opposing surface of the lid member through the seal member and is fixed in a liquid-tight manner. Thus, when the membrane is immersed in the sample solution, pressure from the sample solution is not applied to the entire surface of the membrane. Rather, application of the pressure from the sample solution can be limited to only a portion of the membrane that is not sealed. This can reduce force that would be totally applied to the membrane from the sample solution. Further, a region in the membrane to which the pressure from the sample solution is applied is supported from a back side by the tip end surface of the electrode structure. This can allow the electrode structure to share the force while the membrane avoids receiving the entire force applied from the sample solution.

Thus, according to the membrane-type sensor in accordance with this aspect of the present invention, it is possible to reduce the force that the membrane receives from the sample solution and improve pressure resistance of the membrane while the internal solution is supplied from the outside to suppress deterioration of the internal solution.

Preferably, the membrane is pressed against the tip end surface of the electrode structure by the seal member.

According to such a configuration, the membrane is further brought into close contact with the tip end surface of the electrode structure. Thus, the electrode structure can share the force that the membrane receives from the sample solution, thereby further improving pressure resistance of the membrane.

Preferably, in the membrane-type sensor, the tip end surface of the electrode structure is formed in a curved shape so as to be convexly formed toward a side of the sample solution.

According to such a configuration, the membrane is further brought into close contact with the tip end surface of the electrode structure, thereby still further improving pressure resistance of the membrane. In addition, it is possible to reduce a potential space for air bubble accumulation, on the side of the sample solution beyond the membrane.

According to an aspect of the present invention in which the effect thereof is more noticeably achieved, the housing includes one or a plurality of internal flow paths that communicates between an outer surface of the housing and an internal solution storage space formed by the housing unit.

Preferably, a groove through which the internal solution flows is formed on the tip end surface of the electrode structure.

According to such a configuration, even when the tip end surface of the electrode structure is pressed by the seal member, the internal solution in the housing unit can reliably reach the working electrode through the groove. Thus, conduction between the working electrode and the counter electrode can be easily achieved.

Preferably, to achieve more reliable arrival of the internal solution at the working electrode and more reliable conduction between the working electrode and the counter electrode, the opposing surface of the lid member is annularly formed, and the groove is formed so as to cross an annular region that is a region on the tip end surface of the electrode structure and opposes the opposing surface of the lid member. More preferably, the groove is provided so as to extend from an outermost edge portion of the annular region on the tip end surface of the electrode structure to a surface of the working electrode exposed on the tip end surface of the electrode structure.

In addition, an analyzing apparatus according to another aspect of the present invention includes the membrane-type sensor according to the above aspects of the present invention, and an internal solution replenishment mechanism including an internal solution tank that stores the internal solution, an internal solution feed flow path that feeds the internal solution stored in the internal solution tank to the membrane-type sensor, and a pump. The internal solution replenishment mechanism supplies the internal solution stored in the internal solution tank to the membrane-type sensor when the pump is driven.

According to such a configuration, it is possible to achieve the same operation and effect as those in the membrane-type sensor according to the above aspects of the present invention.

According to the above aspects of the present invention configured as such, it is possible to provide a membrane-type sensor that has an improved pressure resistance of a membrane provided therein while suppressing deterioration of an internal solution.

DETAILED DESCRIPTION

Hereinafter, an analyzing apparatus 400, which includes a membrane-type sensor 100, according to one embodiment of the present invention will be described with reference to the drawings.

Figure 1:
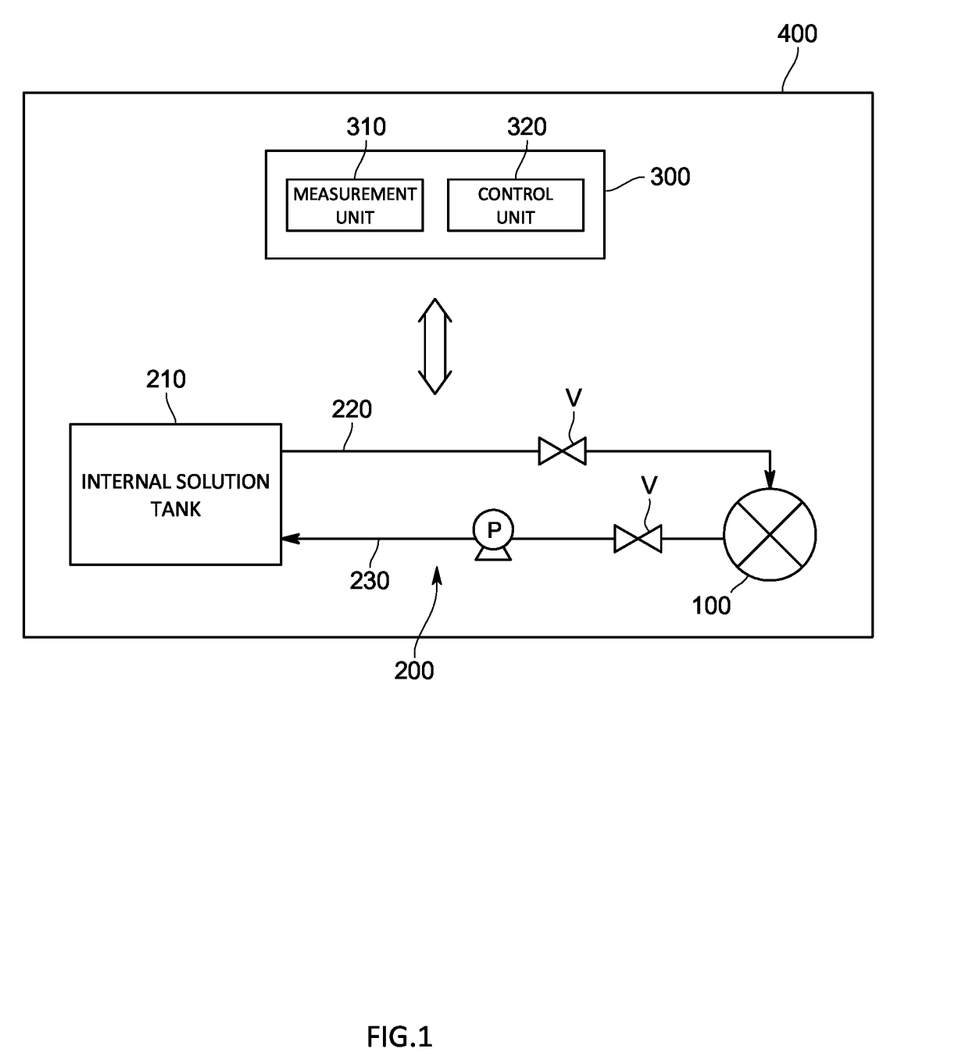
FIG. 1 is a diagram schematically illustrating a configuration of an analyzing apparatus according to one embodiment of the present invention.

The analyzing apparatus 400 according to the present embodiment measures, for example, concentration of a specific substance such as dissolved oxygen in a sample solution such as a chemical solution. Specifically, as illustrated in FIG. 1, the analyzing apparatus 400 includes the membrane-type sensor 100, an internal solution replenishment mechanism 200, and a control device 300. The membrane-type sensor 100, which is immersed in the sample solution, is of an internal solution replenishment type that is configured to allow an internal solution to be supplied from the outside. The internal solution replenishment mechanism 200 supplies an internal solution L to the membrane-type sensor 100.

Figure 2:
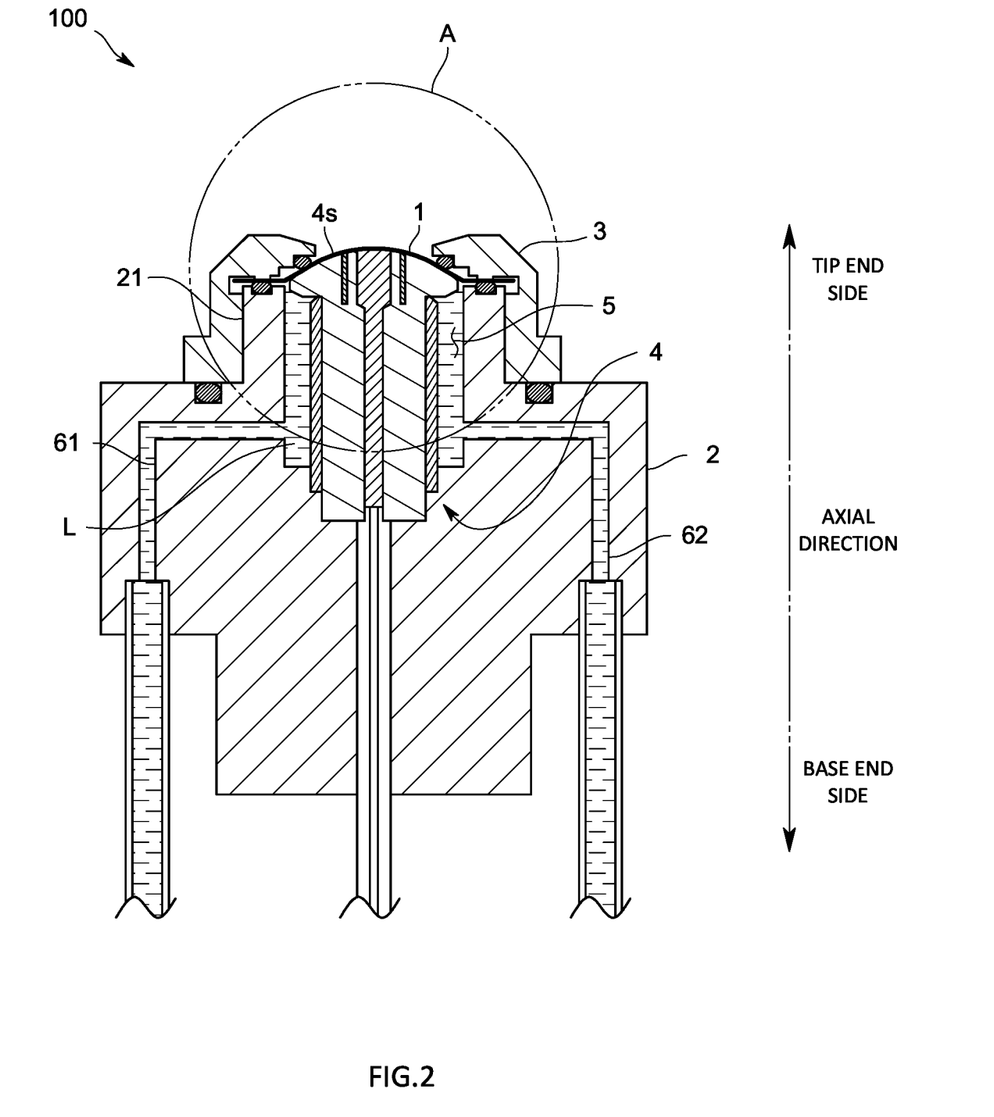
FIG. 2 is a cross-sectional view schematically illustrating a configuration of a membrane-type sensor in the embodiment.

The membrane-type sensor 100 has a membrane 1, such as a gas-permeable membrane, that allows the specific substance in the sample solution to permeate therethrough. The membrane-type sensor 100 detects the specific substance that has permeated based on a current flowing through an electrode structure 4 that is immersed in the internal solution L. Specifically, as illustrated in FIG. 2, the membrane-type sensor 100 includes a housing 2, the membrane 1, and a lid member 3. The housing 2 has a housing unit 21 that contains the internal solution L and the electrode structure 4. The membrane 1 is provided on one surface of the housing 2. The lid member 3 is attached to the housing 2 and fixes the membrane 1 by sandwiching it between the lid member 3 and the housing 2.

The housing 2 has a substantially columnar shape, and is provided with the housing unit 21 having a tube shape (cylindrical tube shape in this embodiment). The housing unit 21 is provided in a tip end portion along an axial direction of the housing 2 and is arranged coaxially with the housing 2.

The electrode structure 4 has a substantially columnar shape, and is coaxially housed inside the housing unit 21. Specifically, the electrode structure 4 includes a support member 41, a working electrode 42 (cathode electrode), a counter electrode 43 (anode electrode), and a guard electrode 44. The working electrode 42, the counter electrode 43, and the guard electrode 44 are attached to the support member 41 and are separated from each other.

Figure 3:
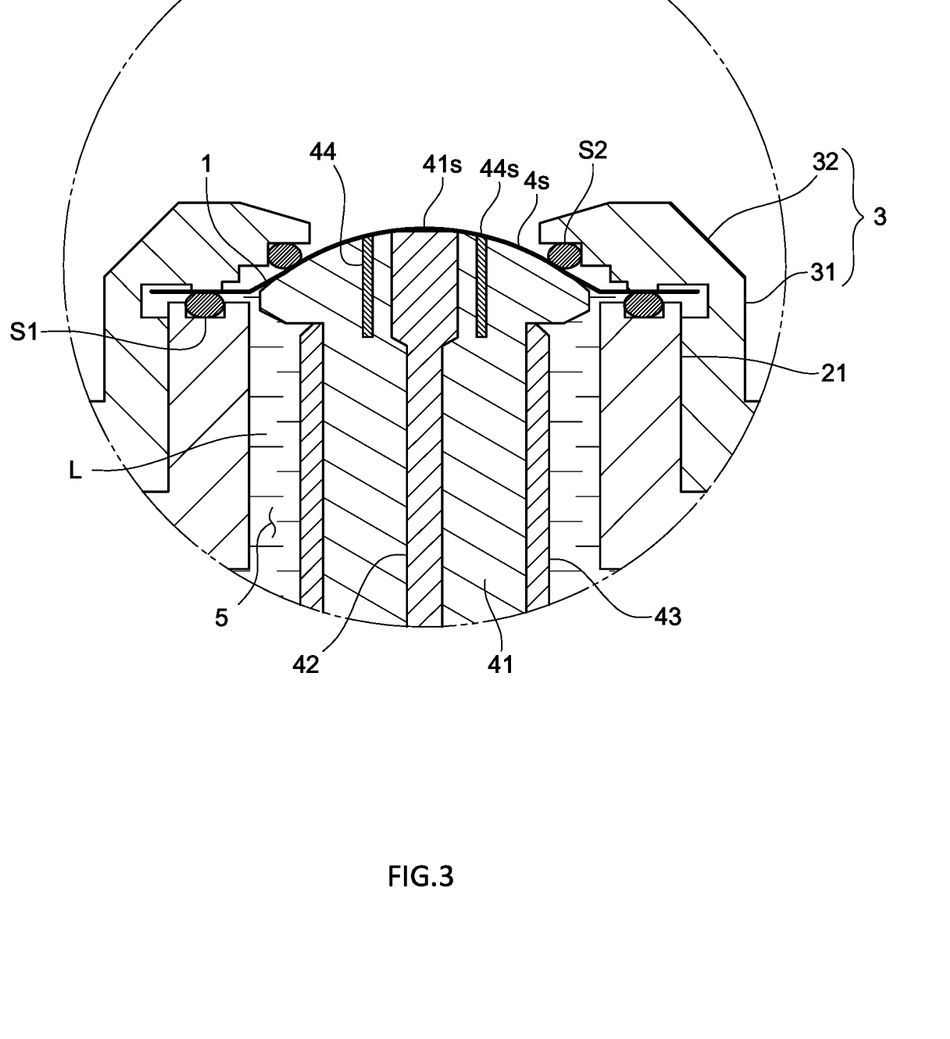
FIG. 3 is an enlarged cross-sectional view of portion A of FIG. 2, schematically illustrating a configuration around a tip end portion of an electrode structure.

The support member 41 is made of an insulating material and has a columnar shape. As illustrated in FIGS. 2 and 3, the support member 41 surrounds the periphery of the working electrode 42 having a rod shape to support it, and also supports the counter electrode 43 in such a manner that the counter electrode 43 is wound around the periphery of the support member 41. The guard electrode 44 having a tube shape is also attached to the support member 41 so as to surround the periphery of the working electrode 42. The working electrode 42 and the guard electrode 44 are provided with respective tip end surfaces, which are exposed on a tip end surface 41s of the support member 41 without forming steps.

Figure 4:
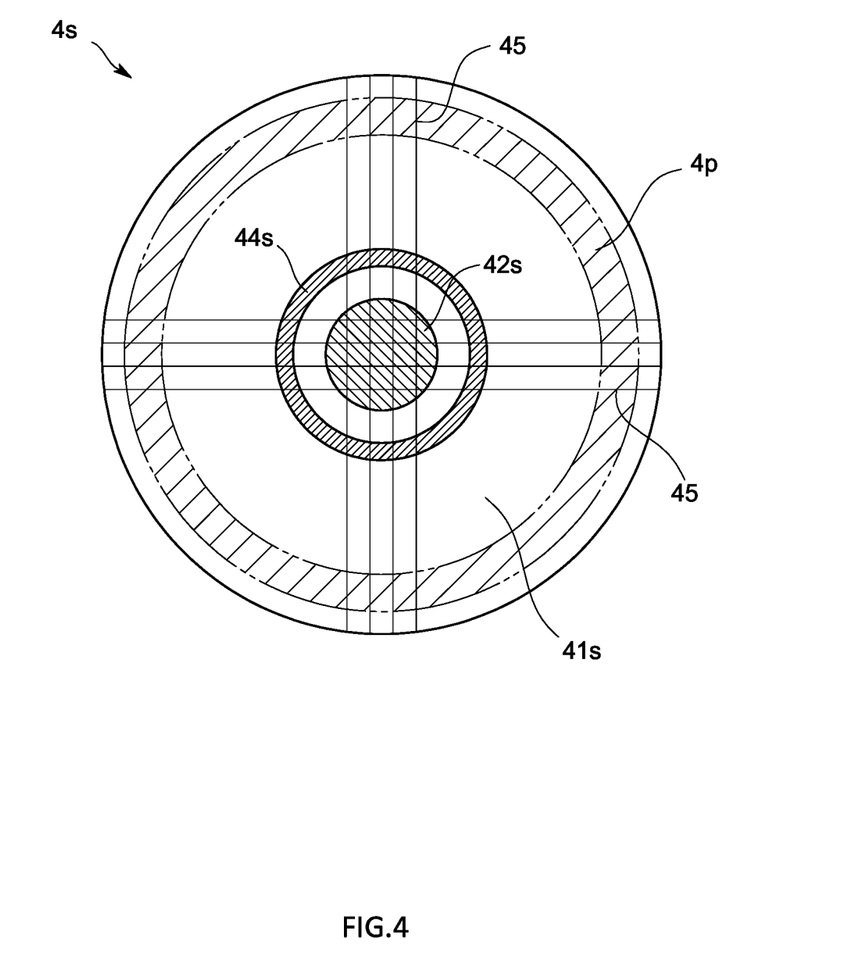
FIG. 4 is a plan view schematically illustrating a configuration of a tip end surface of the electrode structure in the embodiment.

The tip end surface 41s of the support member 41, and the tip end surface 42s (hereinafter, also referred to as the working electrode surface) of the working electrode 42 and the tip end surface 44s (hereinafter, also referred to as the guard electrode surface) of the guard electrode 44 that are exposed on the tip end surface 41s constitute a tip end surface 4s of the electrode structure 4. As illustrated in FIG.

4, the tip end surface 4s of the electrode structure 4 is formed in a circular shape when viewed from an axial direction of the electrode structure 4. The tip end surface 4s has a center region, in which the working electrode surface 42s formed in a circular shape and the guard electrode surface 44s formed in an annular shape surrounding the working electrode surface 42s are concentrically formed.

Figure 5:
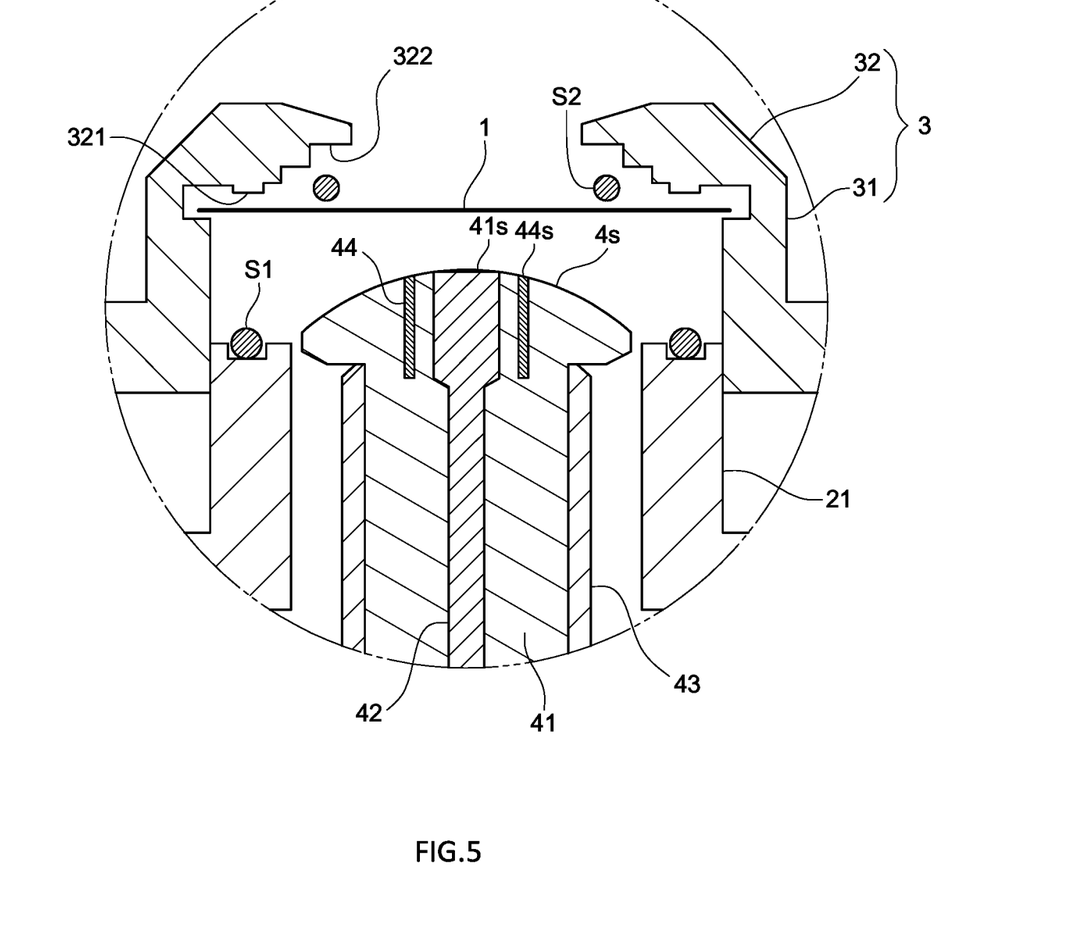
FIG. 5 is an enlarged cross-sectional view of portion A of FIG. 2, schematically illustrating a configuration in which a lid member is removed from a housing.

As illustrated in FIGS. 3 and 5, the housing unit 21 is opened on a tip end side along an axial direction thereof. The membrane 1 is provided so as to close the opening of the housing unit 21. Specifically, the membrane 1 is attached to the tip end of the housing unit 21 such that a center portion of a surface of the membrane 1 opposes and is in contact with the tip end surface 4s of the electrode structure 4. The membrane 1 may be made of any material, such as silicone or fluororesin, as long as the material allows the specific substance in the sample solution to permeate therethrough.

The lid member 3 has a substantially cylindrical tube shape, and is fixedly attached to a tip end portion of the housing unit 21 coaxially with a center axis of the housing unit 21. As illustrated in FIG. 5, the lid member 3 includes a cylindrical tube portion 31 and an eaves portion 32. The cylindrical tube portion 31 is configured to be externally fitted onto the outer periphery of the housing unit 21. The eaves portion 32 has an annular disk shape and extends toward an inner peripheral side from a tip end of the cylindrical tube portion 31. The lid member 3 is fixed to the housing unit 21 by, for example, fixing an inner side surface of the cylindrical tube portion 31 on an outer side surface of the housing unit 21 using, for example, screws or welding.

The lid member 3 includes a first opposing surface 321 that is annularly formed. The first opposing surface 321 opposes a tip end surface of the housing unit 21 while the lid member 3 is fixed to the housing unit 21. Specifically, the first opposing surface 321 is formed on an inward surface of the eaves portion 32. An outer peripheral portion of the membrane 1 is sandwiched between the tip end surface, which is annularly formed, of the housing unit 21 and the first opposing surface 321 of the lid member 3 that opposes the tip end surface of the housing unit 21, through a seal member (specifically, an O-ring) 51. Thus, the membrane 1 is fixed.

Then, the internal solution L is stored in an internal solution storage space 5 that is formed between an inner side surface of the housing unit 21 and an outer side surface of the electrode structure 4. The internal solution L may be, for example, an electrolyte such as potassium chloride, phosphate buffer solution, acetate buffer solution, borate buffer solution, citrate buffer solution, or the like.

In the housing 2, internal flow paths that communicate between an outer surface of the housing 2 and the internal solution storage space 5 are formed. Specifically, the housing 2 has a first internal flow path 61 and a second internal flow path 62 formed therein. The first internal flow path 61 is formed for introducing the internal solution L supplied from the internal solution replenishment mechanism 200 into the internal solution storage space 5. The second internal flow path 62 is formed for discharging the internal solution L in the internal solution storage space 5 to the internal solution replenishment mechanism 200. Each of the first internal flow path 61 and the second internal flow path 62 has one end and the other end. The one end is connected to the internal solution storage space 5, and the other end has an opening formed on the outer surface of the housing 2. The opening of the other end of the first internal flow path 61 and the opening of the other end of the second internal flow path 62 respectively constitute an internal solution inlet port and an internal solution outlet port.

The internal solution replenishment mechanism 200 periodically supplies the internal solution L to the membrane-type sensor 100. This allows a pH value of the internal solution L in the membrane-type sensor 100 to be maintained at a predetermined value or less. The internal solution replenishment mechanism 200 according to the present embodiment is of a circulation type that circulates the internal solution L between the membrane-type sensor 100 and the internal solution replenishment mechanism 200. Specifically, the internal solution replenishment mechanism 200 includes an internal solution tank 210, an internal solution feed flow path 220, an internal solution return flow path 230, a pump P, and a plurality of on-off valves V. The internal solution tank 210 stores the internal solution L. The internal solution feed flow path 220 feeds the internal solution L stored in the internal solution tank 210 to the membrane-type sensor 100. The internal solution return flow path 230 returns the internal solution L in the membrane-type sensor 100 to the internal solution tank 210. The pump P is provided on the internal solution return flow path 230. The on-off valves V are electromagnetic valves, and are provided on the internal solution feed flow path 220 and the internal solution return flow path 230.

The internal solution tank 210 according to the present embodiment mixes and stores, without distinction, an internal solution L to be supplied to the membrane-type sensor 100 and an internal solution L that has been collected from the membrane-type sensor 100. Pressure in the internal solution tank 210 is maintained at a level approximately equal to the atmospheric pressure. Pressure of the internal solution L flowing through the circulation system including the internal solution tank 210 is maintained at a level approximately equal to or less than the atmospheric pressure.

The internal solution feed flow path 220 has one end and the other end. The one end is connected to an outlet port of the internal solution tank 210, and the other end is connected to the internal solution inlet port of the membrane-type sensor 100. The internal solution return flow path 230 has one end and the other end. The one end is connected to the internal solution outlet port of the membrane-type sensor 100, and the other end is connected to an inlet port of the internal solution tank 210. The pump P is periodically operated by the control device 300. Thus, the internal solution L circulates between the internal solution tank 210 and the membrane-type sensor 100 through the internal solution feed flow path 220 and the internal solution return flow path 230.

The control device 300 is a general purpose or dedicated computer including a central processing unit (CPU), a memory, and an input/output interface. The control device 300 at least functions as a measurement unit 310 and a control unit 320 by causing the CPU and peripheral devices to cooperate with each other according to a predetermined program stored in a predetermined area of the memory.

The measurement unit 310 acquires a value of a current flowing between the working electrode 42 and the counter electrode 43 when a measurement voltage is applied between the working electrode 42 and the counter electrode 43. Then, the measurement unit 310 calculates concentration of the specific substance in the sample solution based on the value of the current.

The control unit 320 controls the pump P and the on-off valves V that are incorporated in the internal solution replenishment mechanism 200 such that the internal solution L is periodically supplied to the membrane-type sensor 100. Specifically, the control unit 320 operates such that the internal solution L is periodically circulated in a state where a pH value of the internal solution L stored in the membrane-type sensor 100 is maintained at a predetermined value or less (for example, pH 8.5 or less).

Then, the membrane-type sensor 100 of the analyzing apparatus 400 according to the present embodiment is further configured such that pressure resistance of the membrane 1 is improved. Specifically, the lid member 3 has a second opposing surface 322, which is annularly formed and opposes the tip end surface 4s of the electrode structure 4. The membrane 1 is sandwiched between the tip end surface 4s of the electrode structure 4 and the annular second opposing surface 322 of the lid member 3 through an O-ring S2 and thus is fixed in a liquid-tight manner. More specifically, the membrane 1 is pressed against the tip end surface 4s of the electrode structure 4 by the O-ring S2 and thus is fixed while the O-ring S2 is pressed from a tip end side toward a base end side by the second opposing surface 322.

Specifically, the second opposing surface 322 is annularly formed on the inward surface of the eaves portion 32 of the lid member 3 such that the second opposing surface 322 is located on a further inner peripheral side of the inward surface of the eaves portion 32 compared to the first opposing surface 321. As illustrated in FIGS. 3 and 4, the second opposing surface 322 is concentric with the tip end surface 4s of the electrode structure 4 when viewed from the axial direction thereof. The second opposing surface 322 is formed so as to surround the working electrode surface 42s and the guard electrode surface 44s.

As illustrated in FIG. 4, in the tip end surface 4s of the electrode structure 4, a plurality of grooves 45 is formed, through which the internal solution L flows. Each of the grooves 45 has a linear shape, and is formed so as to cross an annular region 4p and the guard electrode surface 44s when viewed in a plan view. The annular region 4p is a region on the tip end surface 4s of the electrode structure 4 and opposes the second opposing surface 322. Specifically, each of the grooves 45 is provided so as to extend from an outermost edge portion of the annular region 4p to the working electrode surface 42s. Each of the grooves 45 is formed point-symmetrically with respect to the center of the tip end surface 4s of the electrode structure 4 when viewed from the axial direction of the electrode structure 4.

In this embodiment, the tip end surface 4s of the electrode structure 4 is formed in a curved shape such that the tip end surface 4s is convexly formed from a base end side toward a tip end side of the electrode structure 4. Specifically, the tip end surface 4s of the electrode structure 4 is formed in a spherically or aspherically curved shape such that a center portion thereof where the working electrode surface 42s is formed protrudes toward the tip end side of the electrode structure 4.

According to the analyzing apparatus 400 in accordance with the present embodiment configured as described above, the configuration is made such that the internal solution L can be periodically supplied from the internal solution replenishment mechanism 200 to the membrane-type sensor 100. Thus, it is possible to suppress deterioration such as reduction in a pH value of the internal solution L stored in the membrane-type sensor 100. In addition, in the membrane-type sensor 100, the membrane 1 is sandwiched between the tip end surface 4s of the electrode structure 4 and the second opposing surface 322 of the lid member 3 through the O-ring S2 and thus is fixed in a liquid-tight manner. Thus, when the membrane 1 is immersed in the sample solution, pressure from the sample solution is not applied to the entire surface of the membrane 1. Rather, application of the pressure from the sample solution can be limited to only a portion that is not sealed by the O-ring S2. This can reduce force that would be totally applied to the membrane 1 from the sample solution. Further, a region in the membrane 1 to which the pressure from the sample solution is applied is supported from a back side by the tip end surface 4s of the electrode structure 4. This can allow the electrode structure 4 to share the force while the membrane 1 avoids receiving the entire force applied from the sample solution. Therefore, it is possible to reduce the force that the membrane 1 receives from the sample solution and improve pressure resistance of the membrane 1 while the internal solution L is supplied from the internal solution replenishment mechanism 200 to the membrane-type sensor 100 to suppress deterioration of the internal solution L. This can avoid deformation of the membrane 1 when the membrane 1 is immersed in the sample solution. Thus, concentration of the specific substance can be measured with high precision. In addition, the tip end surface 4s of the electrode structure 4 is curved such that the tip end surface 4s is convexly formed toward a side of the solution to be measured. Thus, it is possible to reduce a potential space for air bubble accumulation, on a side of the solution to be measured beyond the membrane 1.

Figure 6:
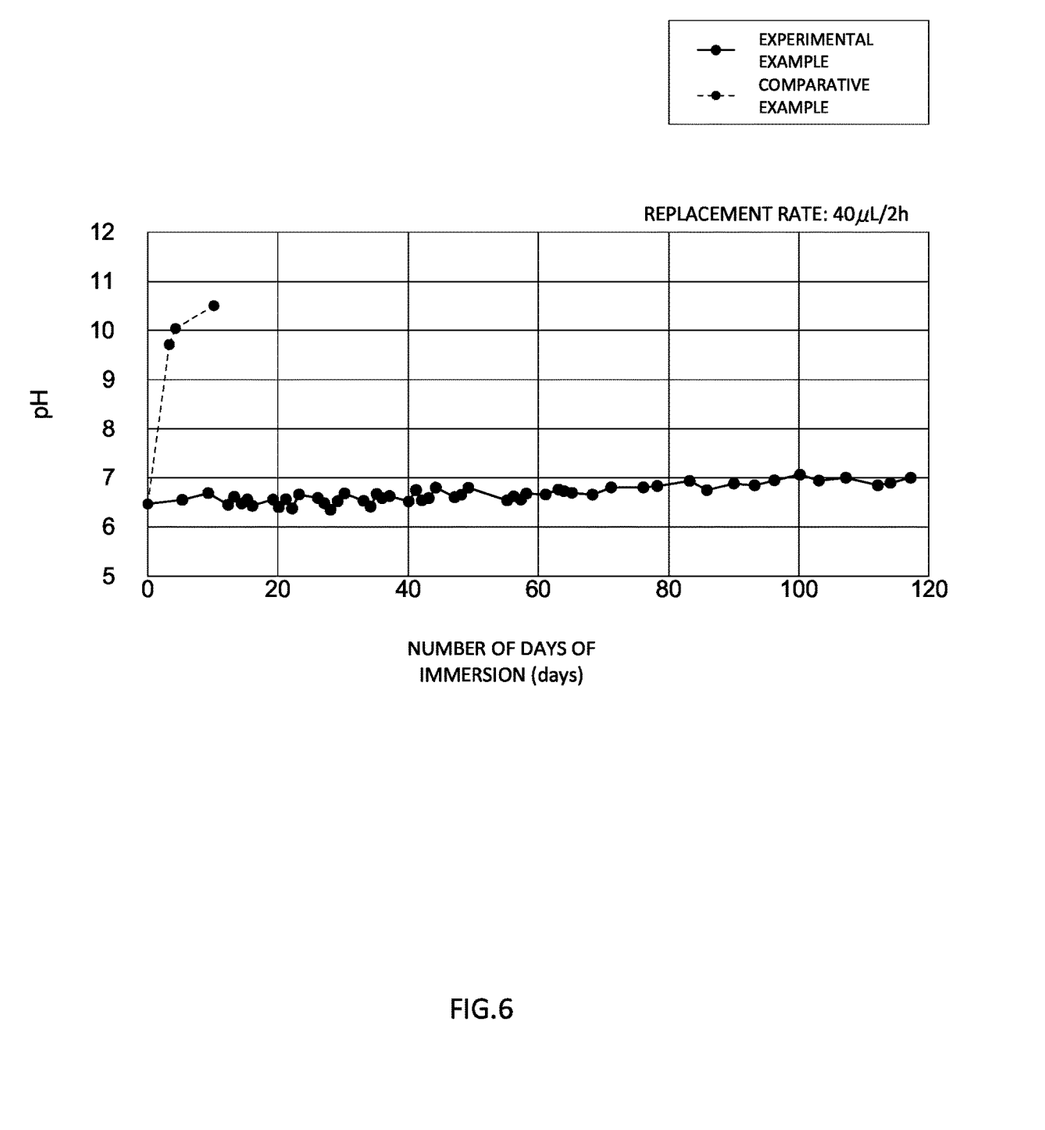
FIG. 6 is a graph illustrating a result of an experiment in which the membrane-type sensor in the embodiment was used.

Here, experimental data is illustrated in FIG. 6. The experiment confirmed a suppression effect on deterioration of the internal solution L, brought by the membrane-type sensor 100 according to the present embodiment. In this experiment, two types of sensors were prepared: the above-described membrane-type sensor 100 used for an experimental example, and a conventional membrane-type sensor used for a comparative example. The conventional membrane-type sensor had the following features: (i) the sensor was of an internal solution non-replenishment type; and (ii) its membrane was not fixed in a liquid-tight manner between an electrode structure and a lid member of the sensor. These two sensors were immersed in a 28% ammonia stock solution, which was used as a solution to be measured. Subsequently, the sensors were allowed to stand at room temperature in a measurement state, and pH values of internal solutions in the sensors were measured. Then, replacement of the internal solution was made for the membrane-type sensor 100 of the experimental example by supplying an additional internal solution at a flow rate of 40 μL/2 h. The membrane-type sensor of the comparative example was not supplied with an additional internal solution. As illustrated in FIG. 6, in the membrane-type sensor of the comparative example, the pH value of the internal solution increased immediately after the start of the measurement, and silver (Ag) was deposited on a surface of the electrode after five days had elapsed. On the other hand, in the membrane-type sensor 100 of the experimental example, there was no great fluctuation in the pH value after the start of the measurement, and the pH value was able to be maintained at 7 or less for 120 days.

Note that the present invention is not limited to the above embodiment.

Figure 7:
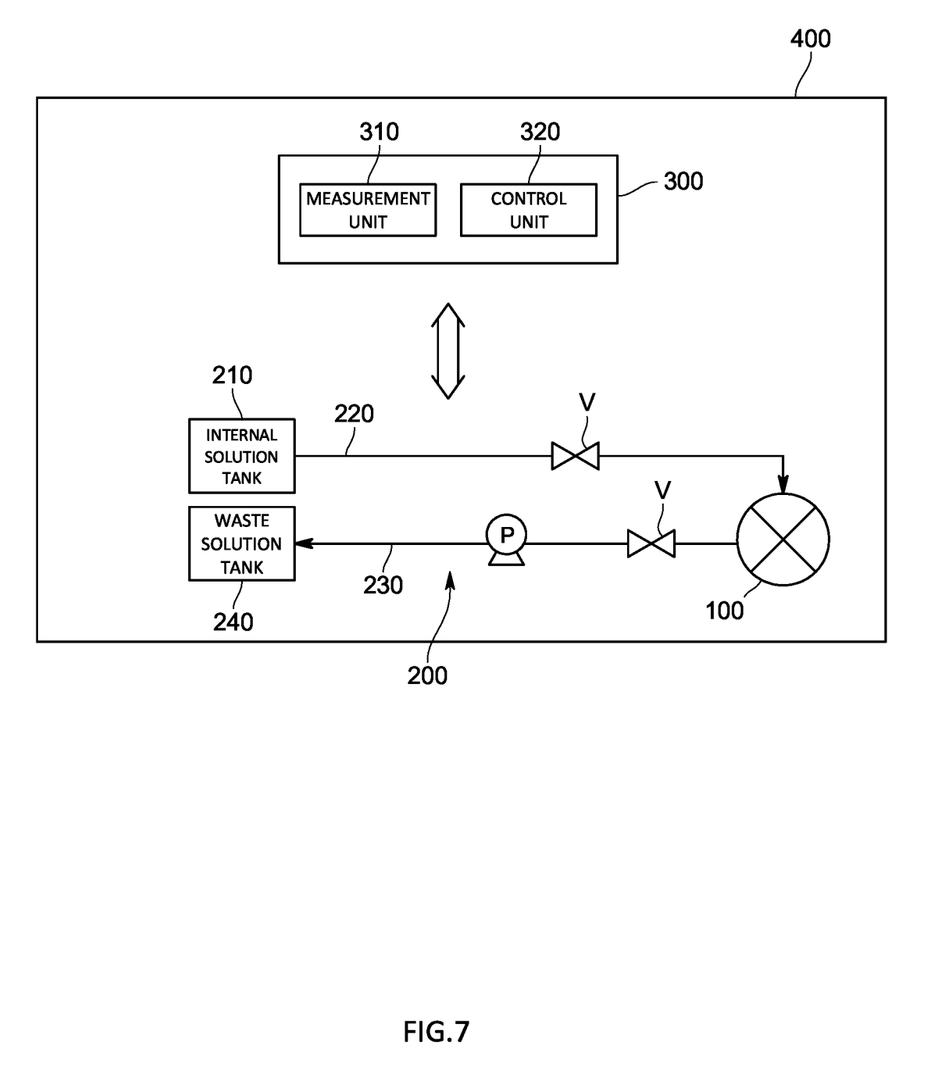
FIG. 7 is a diagram schematically illustrating a configuration of an analyzing apparatus according to another embodiment.

For example, the internal solution replenishment mechanism 200 of the above embodiment is of a circulation type that circulates the internal solution L between the membrane-type sensor 100 and the internal solution replenishment mechanism 200. However, the internal solution replenishment mechanism 200 may not be of a circulation type in another embodiment. In this case, for example, as illustrated in FIG. 7, the internal solution replenishment mechanism 200 may separately include an internal solution tank 210 and a waste solution tank 240. The internal solution tank 210 stores an internal solution L to be supplied to the membrane-type sensor 100. The waste solution tank 240 stores an internal solution L that has returned from the membrane-type sensor 100.

In the membrane-type sensor 100 of the above embodiment, the membrane 1 is fixed in a liquid-tight manner between the second opposing surface 322 of the lid member 3 and the tip end surface 4s of the electrode structure 4 through a single O-ring S2. However, the present invention is not limited to this configuration. In another embodiment, the membrane 1 may be fixed in a liquid-tight manner between the second opposing surface 322 of the lid member 3 and the tip end surface 4s of the electrode structure 4 through a plurality of O-rings S2 that is concentrically provided.

In the membrane-type sensor 100 of the above embodiment, the membrane 1 is pressed against the tip end surface 4s of the electrode structure 4 by the O-ring S2 and thus is fixed in a liquid-tight manner. However, the present invention is not limited to this configuration. In another embodiment, the membrane 1 may be pressed against the second opposing surface 322 of the lid member 3 by the O-ring S2 and thus is fixed in a liquid-tight manner.

In the membrane-type sensor 100 of the above embodiment, the tip end surface 4s of the electrode structure 4 is formed in a curved shape such that the tip end surface 4s is convexly formed. However, the present invention is not limited to this configuration. In another embodiment, the tip end surface 4s of the electrode structure 4 may be formed in a flat shape without being curved.

In the membrane-type sensor 100 of the above embodiment, each of the grooves 45 formed on the tip end surface 4s of the electrode structure 4 has a linear shape. However, the present invention is not limited to this configuration. In another embodiment, each of the grooves 45 may be formed in any shape such as a curved line shape or a zigzag shape. In any shape, each of the grooves 45 is formed so as to cross the annular region 4p and the guard electrode surface 44s on the tip end surface 4s of the electrode structure 4.

In the membrane-type sensor 100 of the above embodiment, on the tip end surface 4s of the electrode structure 4, the tip end surface 41s of the support member 41, the working electrode surface 42s, and the guard electrode surface 44s are formed without steps. However, the present invention is not limited to this configuration. For example, in another embodiment, the working electrode surface 42s may be configured to protrude toward the tip end side of the support member 41 from the tip end surface 41s of the support member 41.

In addition, the seal member S2 of the above embodiment is an O-ring. However, the present invention is not limited to this configuration. The seal member S2 in another embodiment may be formed of any member such as a gasket as long as the seal member S2 can fix the membrane 1 in a liquid-tight manner.

Further, the present invention is not limited to the above embodiments, and it goes without saying that various modifications can be made without departing from the spirit of the present invention.

DESCRIPTION OF REFERENCE NUMERALS

100: membrane-type sensor
1: membrane
2: housing
21: housing unit
3: lid member
322: second opposing surface (opposing surface)
4: electrode structure
4s: tip end surface
42: working electrode
43: counter electrode
5: internal solution storage space
S2: O-ring
L: internal solution

What is claimed is:

1. A membrane-type sensor of an internal solution replenishment type that is configured to allow an internal solution to be supplied from an outside, the membrane-type sensor comprising:
   an electrode structure having a columnar shape, and the electrode structure including a working electrode and a counter electrode;
   a membrane configured to allow a specific substance in a sample solution to permeate through the membrane such that the specific substance that has permeated through the membrane is detected based on a current flowing between the working electrode and the counter electrode that are immersed in the internal solution;
   a housing having a housing unit that contains both the internal solution and the electrode structure, which has a tip end surface on which the working electrode is exposed, wherein
   the housing includes an internal solution storage space that stores the internal solution, the internal solution storage space being formed between an outer circumferential surface of the electrode structure and an inner surface of the housing unit; and
   a lid member attached to a tip end portion of the housing unit, the lid member fixing the membrane by sandwiching the membrane between the lid member and the housing unit such that the membrane opposes the tip end surface of the electrode structure,
   wherein the lid member has an opposing surface that opposes the tip end surface of the electrode structure,
   the membrane is sandwiched between the tip end surface of the electrode structure and the opposing surface of the lid member through a seal member positioned between the opposing surface of the lid member and the membrane, is pressed against the tip end surface of the electrode structure by the seal member so as to make physical contact with the tip end surface of the electrode structure, and is fixed in a liquid-tight manner,
   a plurality of grooves, through which the internal solution flows, is formed in the tip end surface of the electrode structure, and
   with respect to a plan view of the tip end surface of the electrode structure, each of the plurality of grooves cross a path of the seal member so as to extend from an area inside of the seal member at which the working electrode is located to an area outside of the seal member.

2. The membrane-type sensor according to claim 1, wherein the tip end surface of the electrode structure is formed in a curved shape so as to be convexly formed toward a side of the sample solution.

3. The membrane-type sensor according to claim 1, wherein the housing includes one or a plurality of internal flow paths that communicates between an outer surface of the housing and the internal solution storage space.

4. The membrane-type sensor according to claim 1, wherein the opposing surface of the lid member is annularly formed, and the plurality of groove is grooves are formed so as to cross an annular region that is a region on the tip end surface of the electrode structure and opposes the opposing surface of the lid member.

5. The membrane-type sensor according to claim 4, wherein the plurality of grooves are provided so as to extend from an outermost edge portion of the annular region on the tip end surface of the electrode structure to a surface of the working electrode exposed on the tip end surface of the electrode structure.

6. An analyzing apparatus comprising:

the membrane-type sensor according to claim 1; and an internal solution system including an internal solution storage tank that stores the internal solution, an internal solution feed flow path that feeds the internal solution stored in the internal solution storage tank to the membrane-type sensor, and a pump, wherein the internal solution system is configured to supply the internal solution stored in the internal solution storage tank to the membrane-type sensor via the internal solution feed flow path when the pump is driven.

\* \* \* \* \*